United States Patent

Wade et al.

[11] Patent Number: 5,120,799
[45] Date of Patent: Jun. 9, 1992

[54] POLYMERIC COMPOUNDS HAVING PENDANT SULPHONATO GROUPS AND METHOD OF PRODUCING THE POLYMERIC COMPOUNDS

[75] Inventors: John R. Wade, Otley; Robert A. W. Johnstone, Wirral, both of United Kingdom

[73] Assignee: E. I. Du Pont de Nemours and Company (Inc.), Wilmington, Del.

[21] Appl. No.: 405,875

[22] Filed: Aug. 30, 1989

[30] Foreign Application Priority Data

Aug. 31, 1988 [GB] United Kingdom ............... 8820547

[51] Int. Cl.$^5$ .................. C08C 19/20; C08F 8/22
[52] U.S. Cl. ............................ 525/353; 525/61; 525/328.8; 525/505; 525/523
[58] Field of Search ............... 525/61, 353, 328.8, 525/343, 523, 505

[56] References Cited

U.S. PATENT DOCUMENTS

| | | | |
|---|---|---|---|
| 3,615,628 | 10/1971 | Mench et al. | 430/167 |
| 3,791,857 | 2/1974 | Balle et al. | 430/533 |
| 4,258,153 | 3/1981 | Yomamoto et al. | 525/437 |
| 4,323,660 | 4/1982 | Chattha | 525/353 |
| 4,340,519 | 7/1982 | Kotera et al. | 524/385 |
| 4,375,357 | 3/1983 | Wingard, Jr. et al. | 525/353 |
| 4,379,039 | 4/1983 | Fujimoto et al. | 522/16 |
| 4,388,403 | 6/1983 | Helling et al. | 430/546 |
| 4,600,521 | 7/1986 | Nakamura et al. | 525/287 |
| 4,746,703 | 5/1988 | Dallmann et al. | 525/117 |
| 4,810,758 | 3/1989 | Tanabe et al. | 525/162 |
| 4,837,115 | 6/1989 | Igarashi et al. | 525/425 |
| 4,840,885 | 6/1989 | Peters et al. | 430/559 |

*Primary Examiner*—Charles L. Bowers, Jr.
*Assistant Examiner*—John S. Chu
*Attorney, Agent, or Firm*—Harness, Dickey & Pierce

[57] ABSTRACT

A polymeric compound is derived from a polyhydric material and has pendant sulphonate groups of the general formula

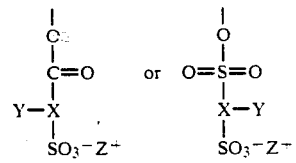

where X is an aliphatic, aromatic, carbocylic or heterocyclic group; Y is hydrogen, halogen or an alkyl, aryl, alkoxy, aryloxy or aralkyl group, $CO_2-Z^+$, $CO_2R$ or $SO_3-Z^+$; $Z^+$ is a cationic counter ion and R is hydrogen, alkyl, alkylene, aryl or aralkyl group.

Wherein the polymeric acompound is produced by reacting a polymer having a plurality of pendant hydroxyl groups with a sulphonato substituted acid or with an ester forming derivative.

11 Claims, No Drawings

POLYMERIC COMPOUNDS HAVING PENDANT SULPHONATO GROUPS AND METHOD OF PRODUCING THE POLYMERIC COMPOUNDS

This invention relates to novel polymeric compounds and more particularly, but not exclusively, is concerned with such compounds for use in radiation-sensitive compositions for coatings in printing plate production or photoresists.

In use, such radiation sensitive compositions are coated on a suitable substrate and image-wise exposed to radiation so that parts of the composition are struck by the radiation and parts are not. The radiation-struck and non-radiation-struck parts have differing solubilities in developer liquids and thus the more soluble parts can be selectively removed by applications of such a liquid to leave an image on the substrate constituted by the less soluble parts. For environmental and health reasons there has been an increasing tendency for wholly aqueous or substantially aqueous based solutions, rather than organic solvents, to be used as the developer liquids. In addition, for environmental, health, and practical reasons it is also desirable to use neutral or mildly alkaline developer liquids rather than strongly alkaline developers. For example where high developer pH is a prerequisite for adequate development, reduction in the pH of the developer can occur rapidly in automatic processors due to neutralization by dissolution of acidic radiation sensitive coating components and due, particularly, to absorption of carbon dioxide from the atmosphere hence rendering the developer inactive or 'exhausted'. It is thus desirable to provide radiation sensitive compositions which exhibit excellent developability at low coating acidity and which require neutral or only mildly alkaline developers and hence give significantly extended developer life. For such solutions to be effective, the radiation-sensitive compositions must be soluble, or at least swellable, in such solutions.

It is an object of the present invention to provide a polymeric compound for use in the preparation of radiation sensitive compositions of this type.

According to one aspect of the present invention, there is provided a polymeric compound comprising a plurality of substituent sulphonate groups wherein the polymeric compound is derived from a polyhydric material and wherein the sulphonate groups are selected from groups of the general formula

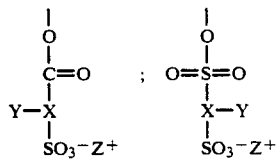

where X is an aliphatic, aromatic, carbocyclic or heterocyclic group; Y is hydrogen, halogen, or an alkyl, aryl, alkoxy, aryloxy or aralkyl group, $CO_2-Z^+$, $CO_2R$ or $SO_3-Z^+$; $Z^+$ is a cationic counter-ion and R is hydrogen, alkyl, alkylene, aryl or aralkyl group.

In an embodiment of the invention the sulphonate groups may be derived from sulphonato substituted acids of the formula

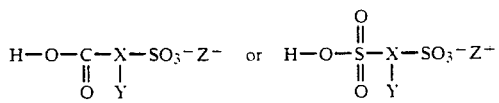

where X, Y, $Z^+$ and R have the meanings specified above.

In another embodiment of the invention the sulphonate groups may be derived from a reactive derivative of a carboxylic or sulphonic acid. Suitable derivatives are, for example, acid chlorides or anhydrides.

In another embodiment of the invention the polymeric compound may comprise two or more different counter-ion species, at least one of which species may be radiation sensitive.

In a further embodiment of the invention, the polymeric compound may be incorporated into a radiation sensitive composition in combination with a diazo compound, a photo-polymerisable compound or a positive working photo-solubilising compound.

According to another aspect of the present invention there is provided a process for the production of a polymeric compound wherein the process comprises providing a polyhydric material having hydroxyl groups and reacting the hydroxy groups of a polyhydric material with a sulphonato substituted acid of the formula

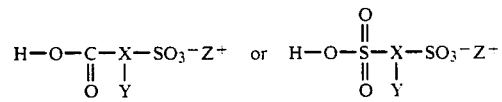

or with an ester forming derivative thereof to obtain the desired polymeric compound which comprises substituent sulphonate groups of the general formula

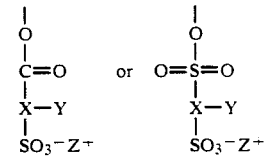

where X, Y, $Z^+$ and R have the meanings specified in above.

If required, subsequent ion exchange of the initial counter-ion $Z^+$ to alternative preferred cations is facilitated within the process either directly, as part of the polymer isolation procedure, or in a subsequent ion-exchange treatment of the previously isolated sulphonic acid derivative. This is particularly desirable where the initial counter-ion is $H^+$.

In a yet further embodiment of the invention the initial counter-ion species may be exchanged for a final desired counter-ion species by means of an ion exchange process.

Suitable synthetic polymers containing hydroxy groups include, in particular, polymers having vinyl alcohol units, such as partially saponified polyvinyl esters; polyvinyl acetals having free hydroxy groups and corresponding reaction products derived from copolymers having vinyl ester units or vinyl acetal units or vinyl alcohol units. Also usable are epoxy resins and saponified epoxy resins, copolymers of allyl alcohol or higher molecular weight unsaturated alcohols, hydroxy acrylic polymers, for example poly (hydroxyalkyl) (meth) acrylate polymers, phenolic polymers such as phenol formaldehyde resins and vinyl phenol polymers, and other similar polymers.

Optionally, the polymeric material may also contain ester groups derived from aliphatic or aromatic carboxylic acids such as octanoic acid, lauric acid or benzoic acid.

The molecular weights of the polysulphonate compounds of the invention can vary over a wide range. Generally, the polysulphonates have average molecular weights in the approximate range between 900 and 200,000 and preferably between 900 and 100,000. The degree of esterification of the polysulphonate products can be quantified in terms of acid-values (AV) where $Z^+ = H^+$, or 'acid-value equivalence' (AVE) where $Z^+$ is other than $H^+$, where the acid-value equivalence refers to the acid-value of the polysulphonate ($Z^+ = H^+$) prior to ion-exchange. The AVs or AVEs of the polysulphonates vary between 5 and 150, preferably between 10 and 90.

Examples of suitable sulphonato-substituted acids and derivatives are: 2-sulphobenzoic acid cyclic anhydride; 3,4,5,6-tetrabromo-2-sulphobenzoic acid cyclic anhydride; sulphoacetic acid; 2-sulphobenzoic acid; 4-sulphobenzoic acid, 5-sulphoisophthalic acid; 4-sulpho-1,8-naphthalic anhydride; 3-sulpho-2-naphthoic acid; 3-sulphophthalic acid; 4-sulphophthalic acid; 4-sulphobenzoyl chloride; naphthalene-1,5-disulphonyl chloride; naphthalene-2,6-disulphonyl chloride; benzene-1,3-disulphonyl chloride; anthraquinone-1,5-disulphonyl chloride; 2-sulphobenzene sulphonic acid cyclic anhydride; 3-sulphonaphthalene-8-sulphonic acid cyclic anhydride; 3-sulpho-2-naphthoic acid cyclic anhydride; 3-sulphopropionic acid cyclic anhydride; furan-2-chlorocarbonyl-5-sulphonic acid; and 2-sulphohexadecanoic acid, 2-sulpholauric acid, 2-sulphomyristic acid, 2-sulphostearic acid, 2-sulphobehenic acid and their cyclic anhydrides.

A wide range of cationic species may be employed, either individually or in combination, as the counterions of the poly sulphonate compounds of the invention and, as such, this allows flexibility to obtain polysulphonate compounds having the required coating solubility and the required radiation-sensitive composition characteristics, of for example sensitivity, hydrophobicity, oleophilicity, developability, image colour contrast, stability, developer life and press performance.

For example, such properties can be improved by selecting the cations from:

A) Cations which have an active role in the essential radiochemical/photochemical reaction on exposure of the composition to radiation, for example as a photosensitiser, photoinitiator, photoactivator, photocrosslinking agent, photoactive acid-release or base-release compound, photooxidant and photo solubilisation agent.

B) Cations which have an active role in a radiation induced reaction which results in the generation of solubility differentials, for example as a cleavable compound, solubilisable compound, a crosslinkable compound, a polymerisable component, or which results in the production of a colour change, for example as indicators, dyes, dye precursors and colour formers.

C) Cations which have the role of introducing desired performance characteristics into the radiation-sensitive composition, for example, polymers, colourants, inhibitors, stabilisers, adhesion promoters, activators, catalysts, surfactants, development aids, oleophilicity enhancers and such like.

Cations may be used individually or in combination to provide the desired radiation sensitive composition characteristics.

Examples of suitable cations which may be used are:
 i) Hydrogen
 ii) Metals such as sodium, potassium, lithium, magnesium, calcium and silver
 iii) Quaternary ammonium compounds such as ammonium ($N^+H_4$), 5-benzylthiuronium, trimethylglycidyl ammonium, vinylbenzyltrimethyl ammonium, dimethyldiallyl ammonium, benzylmethyldiallyl ammonium, trimethyl ammonium ethylmethacrylate, 4-azidophenyldiethyl - ammonium, 4-benzoylbenzyl-trimethyl ammonium, 3-(9-oxo9H-thioxanthen-2,3-γ-4-yloxy)-N,N,N-trimethyl-1-propanaminium, benzyldimethyldodecyl ammonium, benzyldimethylhexadecyl ammonium, benzyldimethyltetradecyl ammonium, benzyltributyl ammonium, benzyltriethyl ammonium, benzyltrimethyl ammonium dodecylethyldimethyl ammonium, ethylhexadecylmethyl ammonium, hexadecyltrimethyl ammonium, methyltrioctyl ammonium, octadecyltrimethyl ammonium, phenyltrimethyl ammonium, tetrabutyl ammonium, tetradecyltrimethyl ammonium, tetradodecyl ammonium, tetraethyl ammonium, tetraheptyl ammonium, trioctyl ammonium, triethyl ammonium, benzyl ammonium, benzyldimethyl ammonium, hydroxymethylisopropyl ammonium, didodecylmethylethylmethacrylate ammonium, tetrahexyl ammonium, tetramethyl ammonium, tetraoctadecyl ammonium, tetraoctyl ammonium, tetrapentyl ammonium, tetrapropyl ammonium, tributylheptyl ammonium and tributylmethyl ammonium.

iv) Quaternary-N-heterocyclic compounds such as N-methyl-N-vinylpyridinium, N-hexadecylpyridinium, N-methylquinolinium, N-methylbenzothiazolium, N,4,4-trimethyl-2-oxazolinium, N-methylphenazonium, 4-dimethylaminostyryl pyridinium, and 2-azidobenzimidazolium, pyridinium, piperidinium and morpholinium.

v) Diazo Compounds such as 4-diazodiphenylamine, 4-diazodiphenylamine polycondensates, compounds as disclosed in EP-A 0 233 072, compounds as disclosed in EP-A 0 030 862, and 2,5-diethoxy,4-(4′methylphenyl)-benzene diazonium.

vi) Polymeric compounds such as poly co(vinylpyrrolidone/vinylimidazolium), poly (5-vinyl-1,2,-dimethylpyridinium), poly (4-vinyl-1-methylpyridinium), and poly(2[4′methoxystyryl-] methylpyridinium).

vii) Cationic dyes such as 3,3′-Diethyloxacarbocyanine, Crystal Violet, Malachite Green, Acridine Orange, and Rhodamine 6G.

viii) Other Compounds such as triphenylcarbenium, 2,4,6-tritolylpyrylium, 2-carboethoxy-4,6-diphenylpyrylium, 2-methyl-3-phenylbenzopyrylium, trimethylsulphonium, trimethylsulphoxonium, triphenylsulphonium, diphenyl iodonium, dithienyl iodonium, 2,4,6-triphenyltriapyrylium, 2,5-dimethylbenzdithylium, triphenyl selenonium, n-hexadecyltri-n-butylphosphonium, allyltriphenyl phosphonium, cinnamyltriphenyl phosphonium, 9-fluorenyl phosphonium, benzyltriphenyl phosphonium and 4-benzoylbenzyldimethyl phosphonium.

The above examples represent a small proportion of the cations which may be used as counter-ions for the polysulphonate compounds of the invention. Reference may be made to Review of Light-Sensitive Tetraarylborates by Douglas G. Borden from Photographic Science and Engineering, Vol.16, Number 4, Jul.-Aug. 1972 which further illustrates the range of classes of cations suitable for use.

The reactions between the synthetic polymer containing hydroxy groups and the sulphonato substituted organic carboxylic acid, acid chloride or acid anhydride or the sulphonato substituted organic sulphonic acid, acid chloride or acid anyhydride are readily achieved and provide very efficient and reproducible esterification processes. This enables polysulphonates of required acid values for particular applications to be prepared readily. Mixed carboxy/sulphonate acids or reactive acid derivatives thereof react with synthetic hydroxy containing polymers to form the corresponding carboxy esters. Evidence of this specificity of reaction is provided by V Iyer and N K Mathur; Anal. Chim. Acta., 554, 33, 1965 (2-sulphobenzoic acid cyclic anhydride) and E E Gilbert, 'Sulphonation and Related Compounds', Chapter 5, J Wiley, Interscience, 1965.

The esterification reactions can be carried out in a range of organic solvents for example N-methylpyrrolidone, butanone, tetrahydrofuran, dioxane or other ethers. Basic catalysts, for example tertiary amines or sodium carbonate are generally employed. Alternatively, esterifications undertaken with acid derivatives other than the acid chloride or acid anhydride may be effected with catalysts such as dicyclohexylcarbodiimide.

Ion-exchange reactions can be carried out by a number of methods known to those skilled in the art. Preferred examples include; i) addition of a reagent which provides cation $Z^+$ in the final polysulphonate to the esterification reaction liquors, optionally followed by drown out of those liquors into water, ii) drown out of the esterification liquors into liquors containing a reagent which provides cation $Z^+$, and iii) dispersion of a reagent which provides cation $Z^+$ in a preferred coating solvent followed by addition of the isolated polysulphonate compound with resultant dissolution of the polysulphonate compound after a period of agitation of the coating liquors.

The compounds of the invention may be incorporated into a variety of radiation sensitive compositions, well known to those skilled in the art and detailed in 'Chemistry for the Graphic Arts' by Paul J. Hartsuch and in 'Light Sensitive Systems' by Jaromir Kosar. In this case, the polysulphonate may be used in simple admixture with the components of the radiation-sensitive composition. In such an application, the primary role of the polysulphonate is that, described by those skilled in the art, of a 'binder' resin or a 'support' resin. Such resins have two principal functions, one of which is to increase the durability and resilience of the composition, which is particularly desirable in printing applications where extended press runs are required, and the other is to provide suitable development properties in preferred developer compositions. Preferred examples of the use of the polysulphonates as binder resins in radiation sensitive compositions are; in combination with diazo compounds; photopolymerisable compounds, for example containing acrylate oligomers; positive-working, photosolubilisable compounds, for example, quinone diazide compounds or quinone diazide polymers said polymers containing both sulphonate groups and quinone diazide groups, the latter linked to the polymer through a sulphonate ester linkage, and such like. As indicated previously, the composition of the compounds of the invention may be designed and selected to impart additionally desired properties to the radiation-sensitive composition such as hydrophobicity, sensitivity, stability and such like. The proportion of polysulphonate compound employed in such radiation sensitive compositions can vary between wide limits depending on the nature of the composition and will generally be from 95 to 5, preferably from 90 to 25, percent by weight of the total coating components.

Alternatively, however, it is also possible to provide radiation sensitive compositions in which radiation sensitive components are introduced, either fully or in part, by using a radiation-sensitive cation, for example, diazo $N_2^+$, azido-quaternary ammonium compounds, cationic cyanine sensitiser dyes, cationic photoinitiators and such like as the counter-ion species of the polysulphonate of the invention as indicated previously (cation group A).

The radiation sensitive compositions of the present invention may also contain additional components known to those skilled in the art to further improve performance, for example dyes, pigments, stabilisers, fillers, surfactants, plasticizers, adhesion promoters and also other resins or polymers.

The following examples illustrate the invention: EXAMPLE 1

52.8 Parts by weight of a poly (vinyl butyral) comprising 71 wt % vinyl butyral units, 26 wt % vinyl alcohol units and 3 wt % vinyl acetate units, and having weight average molecular weight of about 15,000–17,000, was dissolved in 600 parts by weight of 1-methyl-2pyrrolidone by heating to 40° C. On cooling to 25° C., 44.2 parts by weight of 2-sulphobenzoic acid cyclic anhydride and 2.5 parts by weight of sodium carbonate were then added, and the mixture was maintained for 3 hours at 25° C., while stirring. After cooling to 20° C. the clear solution formed was poured into 10,000 parts by weight of a 5% aqueous solution of benzyldimethyltetradecyl ammonium chloride.

The resultant white solid polysulphonate compound was collected on a filter, washed with water and dried in vacuo to constant weight. The AVE of the product was 46, and the yield was 70 parts by weight.

EXAMPLE 2

Stage 1

52.8 Parts by weight of the poly (vinyl butyral) described in Example 1 was mixed with 33.1 parts by weight of 2-sulphobenzoic acid cyclic anhydride, 1.9 parts by weight of sodium carbonate and 600 parts by weight of 1-methyl-2-pyrrolidone and maintained at 25° C. for 4 hours. After cooling to 20° C. the clear polysulphonate solution was diluted with 6,000 parts by weight of water.

Stage 2

2a) Urethane Preparation

P-(N-ethyl-N-2-hydroxyethyl) amino acetanilide (2 mole) in 1-methyl 2-pyrrolidone was added to a solution of 2,4-toluene diisocyanate (1 mole) in 1-methyl 2-pyrrolidone at room temperature. Dibutyl tin dilaurate was added as catalyst and the mixture was heated to 50° C. for five hours, cooled and dripped into water with vigorous stirring. The resulting precipitate was filtered off and washed with water.

2b) Hydrolysis of acetylamino groups

The damp Stage 2a product was mixed with 6N hydrochloric acid and refluxed for 2 hours. The resulting solution was neutralised with sodium hydroxide and the resulting precipitate washed with water and dried.

2c) Diazotisation of amino groups

The Stage 2b produce (1 mole) was added to 6N hydrochloric acid and the mixture cooled to 5° C. Sodium nitrite solution (1.05 mole) was introduced dropwise, the temperature being maintained below 10° C. until diazotisation was complete.

Stage 3

The solution from stage 2c was mixed with the solution obtained in Stage 1 and the product isolated by filtration.

EXAMPLE 3

60 Parts by weight of the poly (vinyl butyral) described in Example 1 was dissolved in 300 parts by weight of 1-methyl-2-pyrrolidone. 19.3 parts by weight of 2-sulphobenzoic acid cyclic anhydride and 1.2 parts by weight of sodium carbonate were then added and the mixture was stirred at 25° C. for 2.5 hours. The clear solution formed was then poured dropwise into 10,000 parts by weight of water to yield a white precipitate which was collected on a filter, washed with water and dried in vacuo to constant weight (yield 54 parts by weight). Analysis: free 2-sulphobenzoic acid 0.3% w/w, AV 28.6.

EXAMPLE 4

60 Parts by weight of the polysulphonate of Example 3 was dissolved in 300 parts by weight of α 1:9 1-methyl-2-pyrrolidone:ethanol mixture to which 15 parts by weight of benzyldimethyltetradecyl ammonium chloride was added. The resulting clear solution formed was then poured dropwise into 10,000 parts by weight of water and the resultant solid collected on a filter, washed with water and dried in vacuo to constant weight (Yield 61 parts by weight). Analysis showed polymer bound counter-ion to be 18.4% w/w and free counter-ion to be less than 0.1% w/w.

EXAMPLES 5–16

The procedure of Example 3 was repeated using 28 parts by weight of 2-sulphobenzoic acid cyclic anhydride to provide a polysulphonate of free-acid content less than 0.1% w/w and an AV of 38.4. This resin was used to produce a range of samples with alternative counter-ions, as indicated below, using a similar procedure to Example 4.

| EXAMPLE | COUNTER-ION |
|---------|-------------|
| 5 | Benzyltrimethyl ammonium chloride |
| 6 | Benzyltriethyl ammonium chloride |
| 7 | Acetonyltriphenyl phosphonium |
| 8 | Benzyldimethylhexadecyl ammonium chloride |
| 9 | Glycidyltrimethyl ammonium chloride |
| 10 | Trimethylammoniumethylmethacrylate |
| 11 | 3,6-Diamino-10-methylacridinium |
| 12 | 3-(9-oxo-9H-Thioxanthen-2,3-γ-4-yloxytrimethyl)-propanaminium |
| 13 | 3,3-Diethyloxacarbocyaninium |
| 14 | Basic Violet 11:1 |
| 15 | Basic Blue 7 |
| 16 | Sodium |

EXAMPLE 17

60 Parts by weight of an epichlorohydrin Bisphenol-A condensate with OH equivalent weight of 8.04 g (0.47 mol)/100 g was dissolved in 600 parts by weight of 1-methyl-2-pyrrolidone at 25° C. 2.6. Parts by weight of 2-sulphobenzoic acid cyclic anhydride and 0.15 parts by weight of sodium carbonate were then added and the mixture was stirred at 25° C. for 2 hours. A water soluble product was formed which was isolated by pouring into 10,000 parts by weight of a 5% aqueous solution of benzyldimethyltetradecyl ammonium chloride. The resultant white solid polysulphonate compound was collected on a filter, washed with water and dried in vacuo to constant weight. Yield 52.5 parts by weight.

EXAMPLE 18

60 Parts by weight of cresol novolak resin was dissolved in 600 parts by weight of methyl ethyl ketone at 30° C. 38.6 parts by weight of 2-sulphobenzoic acid cyclic anhydride and 2.3 parts by weight of sodium carbonate were then added, on which the mixture turned dark red. After stirring at 30° C. for 2 hours, most of the solvent was removed and the product isolated by pouring into 6,000 parts by weight water. After filtering, washing and drying in vacuo, 50 parts by weight of a fine powder product was obtained which had an AV of 132.

EXAMPLE 19

60 Parts by weight of a poly (vinyl formal) comprising 82 wt % vinyl butyral units, 12 wt % vinyl acetate units and 6 wt % vinyl alcohol units, and having weight average molecular weight of about 10,000 to 15,000 was dissolved in 300 parts by weight of 1-methyl-2-pyrrolidone. 14.34 parts by weight of 2-sulphobenzoic acid cyclic anhydride and 0.09 parts by weight of sodium carbonate were then added, and the mixture was stirred at 35° C. The clear solution formed was poured into 10,000 parts by weight of water and the precipitate formed was washed and dried in vacuo to yield 52 parts by weight of a fine white powder. This on analysis was found to have free monomeric acid content of less than 0.1% w/w and AV 10.1.

Ion exchange was carried out as described in Example 4 to provide the benzyldimethyltetradecyl ammonium salt of the polysulphonate.

EXAMPLE 20

The procedure described in Example 3 was used to modify 60 parts by weight of a poly (vinyl butyral) comprising 71 wt % vinyl butyral units, 26 wt % vinyl alcohol units and 3 wt % vinyl acetate units and having weight average molecular weight of 45,000 to 50,000. The addition of 16.2 parts by weight 2-sulphobenzoic acid and 0.9 parts by weight sodium carbonate yielded a product with free acid content 0.1% w/w and AV 28.05. Ion-exchange using benzyldimethyltetradecyl ammonium chloride was undertaken as in Example 4.

EXAMPLE 21

The procedures described in Examples 18 and 4 were repeated using a styrene/allyl alcohol co-polymer of molecular weight 2,500 and 5–7% by weight hydroxyl groups as the hydroxy containing synthetic polymer. The product had an AVE of 14.3.

EXAMPLE 22

The procedure described in Example 1 was repeated using a polyvinylbutyral comprising 46 mole % vinylbutyral units, 2 mole % vinylacetate units, 42 mole % vinyl alcohol units and 10 mole % vinyl octanoate units. The product had an AVE of 32.3.

EXAMPLE 23

The procedure described in Example 1 was repeated using Macrynal SM 548, a hydroxy acrylic copolymer of hydroxy value 66, after evaporation of xylene/butyl acetate solvents. The product had an AVE of 19.4.

EXAMPLE 24

The procedure in Example 1 was repeated using DP 6-3095 hydroxyacrylic polymer (Allied Colloids) of hydroxy value 155. The product had an AVE of 35.2.

EXAMPLES 25 TO 30

The procedure of Example 1 was repeated except in the selection of esterification agent and reaction conditions. Polysulphonates were prepared as indicated in the following table:

| Example No | Esterification Agent (EA) | Charge of EA/p.b.w. | Catalyst | Reaction Temp/°C | AEV of Product |
|---|---|---|---|---|---|
| 25 | 4-Sulpho-1,8-naphthalic anhydride | 66.8 | $Na_2CO_3$ | 60 | 51.4 |
| 26 | 4-Sulpho benzoyl chloride | 53.0 | Pyridine & DMAP | 20 | 38.4 |
| 27 | 3,4,5,6-Tetrabromo-2-sulpho-benzoic acid cyclic anhydride | 120.1 | $Na_2CO_3$ | 25 | 20.1 |
| 28 | 3-Sulphopropionic acid cyclic anhydride | 32.7 | $Na_2CO_3$ | 35 | 41.0 |
| 29 | Furan-2-chloro carbonyl-5 sulphonic acid | 48.6 | Pyridine & DMAP | 20 | 34.2 |
| 30 | Benzene-1,3-disulphonylchloride | 73.7 | Pyridine & DMAP | 5 | 29.4 |

DMAP = Dimethylaminopyridine

EXAMPLE 31

A solution in ethylene glycol monomethyl ether comprising:
2 parts by weight of the polymer of Example 1,
1 part by weight of the diazo compound (41) described in EP-A 0 030 862, and
0.1 parts by weight of Victoria Blue B was whirler coated onto a sheet of electrochemically grained and anodised aluminium and dried to form a radiation sensitive plate (A). The coating weight was 0.8 $gm^{-2}$.

A second radiation sensitive plate (B) was made in the same way, except that a polymer derived from the same grade of poly (vinyl butyral) as used in Example 1 and modified with phthalic anhydride, as described in Example 5 of U.S. Pat. No. 4,631,245, but having an AV of 60, was used instead of the polymer of Example 1.

Plate (A) was exposed through a continuous tone Stouffer stepwedge to UV light (450 $mJcm^{-2}$ from a Berkey-Ascor printing down frame) and developed with an aqueous neutral pH solution containing 8% anionic surfactant. The developed image of the printing plate had a stepwedge of solid 4, tail 10.

The developed image had good ink receptivity and when the plate was placed on a proofing press, the image became fully charged with ink after only 4 passes of the inking rollers.

Plate (B) was exposed in the same way but failed to develop using the above developer and required an alkaline ($pH_{11}$) developer containing trisodium phosphate. When placed on a proofing press, 12 passes of the inking rollers were required for the image to become fully charged.

EXAMPLE 32

Example 31 was repeated except that 1 part by weight of the condensation product of 4-diazodiphenylamine and formaldehyde was used as the radiation sensitive compound in place of diazo compound 41 of EP-A 0 030 862. Similar results were obtained.

EXAMPLE 33

A solution in ethylene glycol monomethyl ether comprising:
3 parts by weight of the polymer of Example 2, and
0.1 parts by weight Victoria Blue B was whirler coated onto a sheet of electrochemically grained and anodised aluminium and dried to form a radiation sensitive plate. The coating weight was 0.8 $gm^{-2}$.

The radiation sensitive plate was exposed through a continuous tone Stouffer step wedge to UV light (450 $mJcm^{-2}$ from a Berkey-Ascor printing down frame) and developed with an aqueous neutral pH solution containing 10% anionic surfactant and 5% benzyl alcohol.

The developed image of the printing plate had excellent ink receiptivity and a step wedge reading of solid 4, tail 11.

EXAMPLE 34

A solution in ethylene glycol monomethyl ether comprising:
2.7 parts by weight of the diazo compound (41) described in EP-A 0 030 862,
1 part by weight of the polymer of Example 1, and
0.25 parts by weight of Basic Red (CI45160) was whirler coated onto a sheet of electrochemically grained and anodised aluminium and dried to form a radiation sensitive plate. The coating weight was 0.6 $gm^{-2}$.

The plate was exposed as described in Example 31, except that an exposure of 600 $mJcm^{-2}$ was used, and was developed with an aqueous neutral pH solution containing 10% anionic surfactant. The developed image of the plate had a step wedge reading of solid 4, tail 10 and a strong red image colour.

The developed image had good ink receptivity and when the plate was placed on a proofing press, the image became fully charged with ink after only 5 passes of the inking rollers.

A similar plate containing, as the binder, the polymer derived from poly (vinyl butyral) and phthalic anhydride, as described in Example 31, instead of the polysulphonate of the present invention, required an exposure of 900 mJcm$^{-2}$ and also the use of an alkaline developer similar to that described for plate B in Example 31 to give the same step wedge reading. The plate also gave a weak coloured image and evidence of considerable dye leaching during development. When placed on a proofing press this plate required 14 passes of the inking rollers to fully charge the image with ink.

EXAMPLE 35

Example 34 was repeated except that the diazo compound was replaced by the same weight of the condensation product of 4-diazodiphenylamine and formaldehyde.

Similar results were obtained.

EXAMPLE 36

A solution in ethylene glycol monomethyl ether comprising:

2 parts by weight of the polymer of Example 1, 1 part by weight of the diazo compound (41) described in EP-A-0 030 862, and 0.3 parts by weight of Microlith Green GT predispersed pigment was whirler coated onto a sheet of electrochemically grained and anodised aluminium and dried to form a radiation sensitive plate. The coating weight was 0.85 gm$^{-2}$.

The plate was exposed and developed as described for Plate A in Example 31. The developed image of the plate had a strong colour, excellent ink receptivity, and a stepwedge reading of solid 5, tail 9.

A similar plate but containing, as the binder, the corresponding polymer derived from poly (vinyl butyral) and phthalic anhydride, as described in Example 31, instead of the polysulphonate of the invention, had a very weak colour strength and poor coating appearance indicating that the binder resin was unable to support adequate pigment dispersion. The development properties of this plate were similar to Plate B of Example 31.

EXAMPLE 37

Example 36 was repeated using the following alternative comments:

2 parts by weight of the polymer of Example 1, 1 part by weight of the diazo compound described in EP 0233072, (Example 4), and 0.3 parts by weight of Microlith Blue 4GK predispersed pigment.

This formulation also provided a plate of excellent image colour, ink receptivity and developability.

EXAMPLE 38

The polysulphonate of Example 4 and a polycarboxylic acid of AV 28.3 (Resin A), derived by phthalic anhydride modification of the same grade of poly (vinyl butyral) were used to prepare radiation-sensitive plates as described in Example 31. The development properties of the 2 plates were compared using the following developers:

| Developer | pH | Developer Composition Surfactant | |
|---|---|---|---|
| | | Type | Level % |
| A | 7.5 | Anionic | 10 |

| Developer | pH | Developer Composition Surfactant | |
|---|---|---|---|
| | | Type | Level % |
| B | 7.7 | Non-Ionic | 15 |
| | | Anionic | 28 |
| | | Non-Ionic | 4 |
| C | 11.0 | Anionoic | 2 |
| | | Non-Ionic | 7.5 |

The results were as follows:

| Plate | Resin | Developer | Mode of Processing | Time of Dev. | Plate Appearance |
|---|---|---|---|---|---|
| I | Example 4 | A | Machine | 30 | Clean |
| II | Resin A | A | Machine | 30 | V heavy blue stain |
| III | Example 4 | B | Hand | 30 | Clean |
| IV | Resin A | B | Hand | 90 | V heavy blue stain & scumming |
| V | Example 4 | C | Machine | 30 | Clean |
| VI | Resin A | C | Machine | 30 | Clean |

The results illustrate the significant improvement in compatibility with neutral developers afforded by the polysulphonate resin relative to Resin A.

Plates I, V and VI were imaged at an exposure of 400 mJcm$^{-2}$ and fitted to a web offset litho printing press. Plate VI gave 105,000 impressions before becoming unnacceptable, due to wear. Plates I and V provided over 140,000 copies before showing a similar degree of wear.

EXAMPLE 39

An extended machine development trial was undertaken with Plates I and VI of Example 38 with Developers A and C, respectively, using a plate throughput rate of 5 m$^2$ per day.

The results were as follows:

| Plate | Developer | Initial pH | After 10 days Developer pH | Plate Appearance |
|---|---|---|---|---|
| I | A | 7.5 | 7.2 | Clean |
| VI | C | 11.0 | 9.3 | Heavy blue stain/scum |

The reduction in pH for Developer C during the trial, which is attributable to absorption of carbon dioxide from the atmosphere, resulted in inadequate development of Plate VI after 10 days. Developer A showed minimal pH change over this period and gave effective development of Plate I throughout the trial.

EXAMPLE 40

A radiation sensitive coating was prepared as follows:

4 Parts by weight of the polysulphonate of Example 3 were dispersed in 220 parts by weight of ethylene glycol monomethyl ether. 0.008 Parts by weight of benzyldimethyltetradecyl ammonium chloride were added to the dispersion, which after stirring for 30 minutes, formed a clear solution of the polysulphonate.

2 Parts by weight of diazo compound 41 described in EP-A 0 030 862 and 0.2 parts by weight of Victoria Blue B were added to this solution.

The resultant coating was used to prepare a radiation sensitive plate as described in Example 31. On Berkey Ascor frame exposure to 400 mJcm$^{-2}$ and processing in Developer B of Example 38, the performance of this plate was identical in all aspects to a plate corresponding to Plate III of Example 38.

EXAMPLE 41

The procedure described in Example 40 was repeated, varying the proportion and type of cation-exchange agent employed. The results were as follows.

| | Cations | | | Plate Performance | | |
|---|---|---|---|---|---|---|
| | | | | Development | Image | |
| Examples | I | II | Ratio I:II | Speed/s | Oleophilicity | Step-Wedge |
| 41A | benzyldimethyl-tetradecyl ammonium | H+ | 85:15 | 15–30 | Excellent | 4,10 |
| 41B | benzyldimethyl-tetradecyl ammonium | H+ | 75:25 | 15–30 | Excellent | 4,11 |
| 41C | benzyldimethyl-hexadecyl ammonium | — | 100:0 | 15–30 | Excellent | 4,10 |
| 41D | benzyltriethyl ammonium | H+ | 75:25 | 15–30 | Excellent | 4,10 |
| 41E | benzyltriethyl ammonium | — | 100:0 | 15–30 | Excellent | 5,10 |
| 41F | trimethyl-ammonium ethylmethacrylate | H+ | 85:15 | 15–30 | Excellent | 4,10 |
| 41G | triethylammonium ethylmethacrylate | — | 100:0 | 15–30 | Excellent | 4,10 |
| 41H | glycidyltrimethyl ammonium | H+ | 85:15 | 30 | Excellent | 5,11 |
| 41I | glycidyltrimethyl ammonium | — | 100:0 | 15–30 | Excellent | 4,11 |
| 41J | methyltriphenyl phosphonium | H+ | 85:15 | 15–20 | Good | 3,10 |
| 41K | acetonyltriphenyl phosphonium | H+ | 85:15 | 15–30 | Excellent | 4,10 |
| 41L | acetonyltriphenyl phosphonium | — | 100:0 | 15–30 | Excellent | 4,10 |
| 41M | Basic Violet 11.1 | — | 100:0 | 30 | Good | 3,10 |
| 41N | Basic Blue 7 | — | 100:0 | 30 | Excellent | 4,11 |
| 41P | benzyldimethyl-tetradecyl ammonium | Basic Blue 7 | 25:75 | 30 | Excellent | 4,11 |

EXAMPLE 42

Radiation sensitive plates were prepared as described in Example 31 using the polysulphonates detailed below. After exposure to 400 mJcm$^{-2}$ on a Berkey Ascor Frame and processing, the plates were found to give similar excellent development, speed and image oleophilicity to Plate III of Example 38.

Polysulphonates

Example 5
Example 6
Example 7
Example 8
Example 9
Example 10
Example 11
Example 19
Example 20
Example 22

EXAMPLE 43

Plates were prepared and processed according to the procedure described in Example 31, using the following polysulphonates:
Example 25
Example 26
Example 28

The resultant plates exhibited very similar characteristics to Plate A of Example 31.

EXAMPLE 44

Example 34 was repeated using the polysulphonates of Examples 14 and 15 individually and in each case omitting the Basic Red 1 shading dye from the formulation. After exposure and development these polysulphonates provided plates with intense magenta and greenish-blue coloured images, respectively. Image areas exhibited minimal dye leaching on extended development and excellent hydrophobicity.

EXAMPLE 45

The polysulphonate of Example 18, and as reference, the unmodified cresol novolak of Example 18, were each used to prepare a positive working radiation sensitive plate of coating weight 2.0 gm$^{-2}$ on grained and anodised aluminium using the following formulation in 95/5 methylethyl ketone/ethylene glycol monomethyl ether.

| | Parts by Weight |
|---|---|
| Phenolic Resin | 6 |
| 5-Sulpho-1,2-naphthoquinone diazide ester | 1.5 |

| | Parts by Weight |
|---|---|
| Sudan Yellow Dye | 0.1 |

The resultant plates were exposed as in Example 31 and processed in aqueous developers containing nonionic surfactant as indicated below.

| Resin | Exposure/ mJcm$^{-2}$ | Developer | Result |
|---|---|---|---|
| Example 18 | 300 | pH 13 | Clean, 2, 6 |
| Cresol Novolak | 300 | pH 13 | Clean, 2, 6 |
| Example 18 | 600 | pH 10.5 | Clean, 2, 7 |
| Cresol Novolak | 600 | pH 10.5 | Scum |

The results clearly illustrate the improved developability of the polysulphonate compound over the unmodified cresol novolak in reduced pH developers.

EXAMPLE 46

A solution in methyl ethyl ketone comprising:
3 parts by weight of the dimethacrylate ester of diglycidyl ether of bisphenol A.,
1 part by weight of the polymer of Example 1
0.15 parts by weight of 2(4'-chlorophenyl)-4,6-bis(trichloromethyl)-S-triazine, and
0.15 parts by weight of ethyl Michler's Ketone was whirler coated onto a sheet of electrochemically grained and anodised aluminium and dried to form a radiation sensitive plate. The coating weight was 1.0 gm$^{-2}$.

The dried coating was overcoated with poly (vinyl alcohol) to prevent oxygen inhibition.

The plate was exposed through a continuous tone Stouffer stepwedge to UV light (20 mJcm$^{-2}$ from a Berkey-Ascor printing down frame) and developed with an aqueous solution containing sodium propanoate, sodium benzoate and a surfactant. The developed image of the printing plate exhibited excellent ink receptivity. When placed on a proofing press, the image became fully charged with ink after 4 passes of the inking rollers. The stepwedge reading was solid 4, tail 10.

A similar plate which contained the aforementioned phthalic anhydride modified binder of Example 31 plate in place of the polysulphonate polymer of Example 1 required 10 passes on the proofing press for the image to become fully charged with ink. Each plate gave greater than 300,000 good copies when run on a web offset press.

EXAMPLE 47

Example 46 was repeated using in place of the polysulphonate of Example 1, the polysulphonate of Example 4 (Plate I), and, as a reference, Resin A of Example 38 (Plate II). The development characteristics of the resultant plates were compared using the following developers:

| Developer | pH | Developer Composition | |
|---|---|---|---|
| | | Solvent (%) | Surfactant (%) |
| C (described in Example 38) | | | |
| D | 13 | 0 | Non-ionic (5) Anionic (5) |
| E | 10.5 | Benzylalcohol (7) | Anionic (5) |

The results were as follows:

| Plate | Developer | Time of Development/ min | Plate Appearance |
|---|---|---|---|
| I | C | 2 | Clean |
| II | C | 2 | Coating almost totally intact |
| I | D | 0.5 | Clean |
| II | D | 1 | Minimal coating removal |
| I | E | 1 | Clean |
| II | E | 2 | Very heavy stain/scum |

EXAMPLE 48

Example 47 was repeated using the same polysulphonate and reference resins but at an increased level of 3 parts by weight. The plates were exposed to 50 mJcm$^{-2}$ and processed in Developer D of Example 47. The plate derived from comparison resin A gave no detectable development whilst the polysulphonate derived plate gave a clean plate after a 2 minute development period.

EXAMPLE !

The procedure described in Example 46 was repeated except that 0.10 parts by weight of Sudan Yellow were included in the coating formulations. The plate derived from the polysulphonate of Example 1 was bright yellow in appearance. The plate derived from the phthalic anhydride derived reference resin was bright orange in colour, indicating premature triggering of the acid-sensitive dye had occurred, and on exposure this plate also exhibited inferior colour contrast to that of the plate derived from the polysulphonate resin.

EXAMPLE 50

A solution in 1:1 methyl ethyl ketone/ethylene glycol monomethyl ether comprising:
4 parts by weight of the urethane acrylate disclosed as Prepolymer A in Example 1 of U.S. patent application 07-96893,
1 part by weight of polysulphonate compound, and
0.15 parts by weight of 2-(4'-trichloromethylphenacylidene)-1,3,3-trimethyl-5-chloroindoline was used with a range of polysulphonates detailed below to prepare plates according to the procedure described in Example 46. After exposure to 25 mJcm$^{-2}$ on a Berkey Ascor frame and processing in Developer C of Example 47 the following results were obtained:

| Plate | Polysulphonate Example No | Dev. Time/ seconds | Oleophilicity | Wedge |
|---|---|---|---|---|
| 1 | 8 | 45 | Excellent | 5,12 |
| 2 | 9 | 60 | Excellent | 5,13 |
| 3 | 10 | 45 | Excellent | 6,13 |
| 4 | 17 | 75 | Good | 4,12 |
| 5 | 21 | 75 | Excellent | 5,12 |
| 6 | 23 | 60 | Excellent | 5,11 |
| 7 | 24 | 45 | Good | 4,11 |
| 8 | 29 | 45 | Good | 4,12 |

-continued

| Plate | Polysulphonate Example No | Dev. Time/ seconds | Oleophilicity | Wedge |
|---|---|---|---|---|
| 9 | 30 | 60 | Good | 5.13 |

EXAMPLE 51

A solution in methyl ethyl ketone comprising:

3 Parts by weight of the urethane acrylate of Example 50, 1 part by weight of the polysulphonate of Example 12 was used to prepare a radiation sensitive plate (Plate A) as described in Example 46. A reference plate (Plate B) was also prepared using a phthalic acid modified poly (vinyl butyral) of acid-value 38.9 (Resin B) in place of the polysulphonate.

The plates were exposed on a Berkey Ascor frame (200 mJcm$^{-2}$) and processed through Developer D of Example 47. Plate A gave a strong oleophilic image and a wedge of 4,9 illustrating the action of the counter ion of the polymer as a photoinitiator. Plate B gave no image. Plate B was also exposed to 1000 mJcm$^{-2}$ but failed to give an image.

EXAMPLE 52

Plates were prepared as described in Example 46 using the polysulphonate of Example 13 (Plate A) and, as a reference, using Resin B described in Example 51 (Plate B), except that in each case ethyl Michler's ketone was omitted.

The plates were exposed with light of wavelength 435 nm (filtered Hg Photopolymer light source) (60 mJcm$^{-2}$) and processed with Developer D of Example 47. Plate A gave a strong, oleophilic image and a stepwedge reading of 3,8. Plate B failed to give an image with exposures up to 1000 mJcm$^{-2}$.

Plate A was also exposed to 25 mJcm$^{-2}$ with an argon-ion laser operating at 488 nm using an Eocom 'Laserite' exposure unit. A similar strong image to that described above was produced after processing in Developer D. This example illustrates the photosensitising action of the polysulphonate resin.

EXAMPLE 53

A solution in 1-methoxy-2-propanol comprising:

3 Parts by weight of the urethane acrylate of Example 50, 1 part by weight of the polysulphonate of Example 4, 0.15 parts by weight of 2-(4'trichloromethylphenacylidene)-1,3,3-trimethyl-5-chloroindoline, 0.5 parts by weight of the diazo resin described in Example 31, and 0.1 parts by weight of Sudan Yellow was used to prepare radiation sensitive plates as described in Example 46, except that overcoating with poly (vinyl alcohol) was omitted. The plate was exposed on a Berkey Ascor frame to 200 mJcm$^{-2}$. On processing in Developer C of Example 38, rapid development occurred to provide a highly oleophilic image and a step wedge reading of 5,9.

EXAMPLE 54

An aqueous coating solution containing:

2 Parts by weight of the zinc chloride salt of 4-diazo diphenylamine-formaldehyde condensate and 1 part by weight of the polysulphonate of Example 16 was applied to grained and anodised aluminium to provide a radiation-sensitive plate of coating weight 0.3 gm$^{-2}$. After exposure to 100 mJcm$^{-2}$, the plate was processed with the aqueous emulsion developer described in Example 1 of U.S. Pat. No. 4,714,670 to provide a distinct red image and a stepwedge reading of 5,10.

EXAMPLE 55

Example 54 was repeated except that the polysulphonate of Example 3 was used to make two plates as follows: The resin was dispersed in water and i) ammonium hydroxide (Plate A) and ii) 2-amino-2-methyl-1-propanol (Plate B) were added dropwise until dissolution of the polysulphonate occurred. An aqueous solution of the diazo resin was added to each polymer solution and these were used to make plates of coating weight 0.2 gm$^{-2}$. Exposure, processing and results were similar to those described in Example 54.

EXAMPLE 56

32% parts by weight of Diazo R0220, (a novolak resin partly esterified with 2,1-naphthoquinone diazide-5-sulphonic acid and available through Rohner Ltd.) was dissolved in 300 parts by weight of THF at room temperature. To this stirred solution was added 0.5 parts by weight pyridine and 0.1 parts by weight 4-dimethylaminopyridine followed by 13 parts by weight 2-sulphobenzoic acid cyclic anhydride. Gentle cooling was applied as necessary to keep the temperature at 15° C. to 25° C. and the reaction was left stirring for a total of six hours. The product was isolated as a pale brown solid by drowning out the reaction solution into 3000 parts by weight water containing 1% v/v concentrated hydrochloric acid. The product was filtered and washed twice in water before drying at 30° C. under vacuum. 35 parts by weight of material was obtained having an AV of 27 and less than 0.2% w/w of free 2-sulphobenzoic acid.

20 parts by weight of the polysulphonate obtained above was dissolved in 200 parts by weight of THF, to which solution 5 parts by weight of benzyldimethyltetradecylammonium chloride was added. The resulting solution was then sprayed into 3000 parts by weight of vigorously agitated water and the precipitated solid was filtered off, washed several times in water and dried under vacuum at 30° C. to constant weight to yield 23 parts by weight of pale brown solid. Analysis showed polymer bound counterion to be 12.3% w/w and free counterion to be less than 0.1% w/w.

We claim:

1. A polymeric material comprising a plurality of substituent sulphonate groups wherein the polymeric material is derived from a polymer having a plurality of pendant hydroxy groups attached to the polymer backbone, or a side chain thereof, and wherein the sulphonate groups are selected from groups of the general formula:

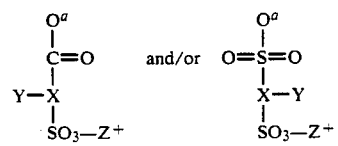

where X is an aliphatic, aromatic, carbocyclic or heterocyclic group; Y is hydrogen, halogen, or an alkyl, aryl, alkoxy, aryloxy or aralkyl group, $CO_2-Z^+$, $CO_2R$ or $SO_3^-Z^+$; $Z^+$ is a cationic counter-ion, R is hydrogen, alkyl, alkylene, aryl or aralkyl group and $O^a$ is derived from a hydroxyl group of the polymer, less H.

2. A compound according to claim 1 wherein the sulphonate groups are derived from sulphonato substituted acids of the formula

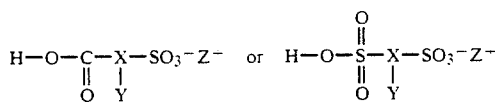

where X, Y, $Z^+$ and R have the meanings specified in claim 1.

3. A compound according to claim 1 wherein the sulphonate groups are derived from a reactive derivative of a carboxylic or sulphonic acid.

4. A compound according to claim 3 wherein the reactive derivative of the carboxylic or sulphonic acid is an anhydride or acid chloride.

5. A compound according to claim 1 wherein the molecular weight of the polymeric compound is in the range 900 to 200,000.

6. A compound according to claim 1 wherein the acid value or acid value equivalence of the compound is in the range 5 to 150.

7. A compound according to claim 1 wherein the compound comprises two or more different counter-ion species.

8. A compound according to claim 7 wherein at least one of the counter-ion species is radiation sensitive.

9. The compound of claim 1, wherein X is an aromatic group having a maximum of two aromatic ring units therein.

10. A process for the production of a polymeric compound wherein the process comprises providing a polymer having a plurality of pendant hydroxyl groups and reacting the said hydroxy groups with a sulphonato substituted acid of the formula.

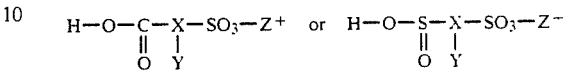

or with an ester forming derivative thereof to obtain the desired polymeric compound which comprises substituent sulphonate groups of the general formula:

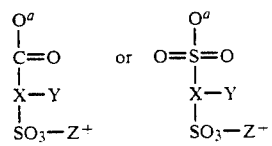

where X is an aliphatic, aromatic, carbocyclic or heterocyclic group; Y is hydrogen, halogen, or an alkyl, aryl, alkoxy, aryloxy or aralkyl group, $CO_2-Z^+$, $CO_2R$ or $SO_2-Z^+$; $Z^+$ is a cationic counter-ion, R is hydrogen, alkyl, alkylene, aryl or aralkyl group and $O^a$ is derived from a hydroxyl group of the polymer, less H.

11. A process according to claim 10 wherein the initial counter-ion species is exchanged for a final desired counter-ion species by means of an ion-exchange process.

* * * * *